United States Patent Office 3,506,457
Patented Apr. 14, 1970

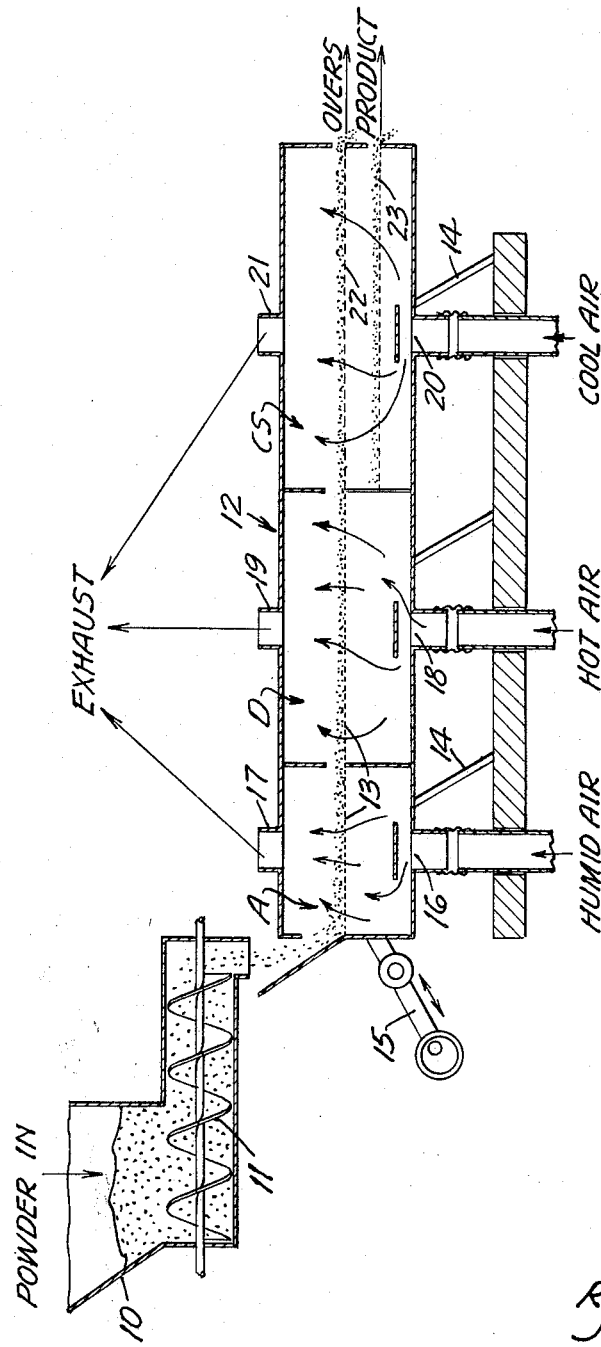

3,506,457
AGGLOMERATED SUGAR PRODUCTS AND METHOD
Rolf G. Gidlow, North St. Paul, Jolyon A. Stein, Minneapolis, and Warren L. Ganske, Osseo, Minn., and Alexander M. Zenzes, Frankfurt am Main, Germany, assignors to The Pillsbury Company, Minneapolis, Minn., a corporation of Delaware
Continuation-in-part of application Ser. No. 100,210, Apr. 3, 1961. This application Feb. 25, 1965, Ser. No. 440,992
Int. Cl. A23l 1/22, 1/26
U.S. Cl. 99—141                                    9 Claims

ABSTRACT OF THE DISCLOSURE

Brown sugar and fondant (mixtures of extremely fine crystalline sucrose and non-crystallizing sugars) are hygroscopic and tend to cake severely when stored for long periods of time. As a result they are difficult to remove from containers and are not readily dispersed in liquids. These problems are overcome by forming a mixture of fractured sugar crystals of less than 150 microns in diameter. The syrup is distributed upon and coats substantially the entire surface area of the fractured sugar crystals. The weight ratio of the syrup to fractured sugar crystals is greater than the sugar crystals could accommodate and yet be free-flowing but no greater than the fractured sugar crystals could accommodate and be free-flowing. Less than 6% moisture is added to this material to increase the tackiness of the surfaces and induce the particles to form agglomerates. The agglomerates are then dried.

---

This invention relates to methods for producing non-caking free-flowing and readily dispersible agglomerates from mixtures of sugars and syrups and to products resulting therefrom.

This application is a continuation-in-part of our prior application, Ser. No. 100,210, filed Apr. 3, 1961 and now abandoned.

Mixtures of sugar and sugar syrups, generally known as soft sugars, are important compositions in commerce. Two principal examples are the brown sugars and the dry sugar mixtures used in the preparation of fondants.

Brown sugar is a mixture of sucrose crystals and molasses, the latter being a crude syrup containing sugars (a portion of which are of the non-crystallizing type), impurities and water. Brown sugars are produced in the cane sugar industry by terminating the sucrose refining process before complete removal of the mother liquor. In the beet sugar industry, brown sugars are formed by adding molasses derived from cane refining processes to refined bee sucrose. The primary reason for production of brown sugars in this manner is that the molasses produced in the beet industry is unpalatable. Brown sugars produced in this manner are sometimes referred to as "painted" sugars. Painted sugars may also be produced by blending flavored syrups other than molasses with sugar.

Fondants may be broadly described as mixtures of extremely fine crystalline sucrose particles and syrups which contain noncrystallizing sugars. Fondants are useful as icings, chocolate cream centers, fudges and the like. They are characterized by being extremely smooth in texture as a result of the fine particle size of the sugar crystals. An important function of the syrups which are contained in the fondants is to prevent crystal growth and the accompanying loss of the characteristic smooth texture. The particle size necessary to give the proper texture to fondants is the particle size below the minimum size which is detectable by the tongue of the consumer. The threshold of oral detection of particle identity is usually placed at about 40 microns.

By conventional techniques, fondants are quite difficult and time consuming to make. According to the conventional process a solution of sucrose and glucose or invert is concentrated by boiling to certain critical concentrations, carefully cooled to certain critical crystallization temperatures, and then beaten vigorously to induce crystallization. When properly performed, the process yields extremely fine sucrose crystals which provide the smooth texture which is characteristic of fondants.

Because of the difficultties and uncertainties involved in producing fondants in the conventional manner, many attempts have been made, with varying degrees of success, to produce dry mixes from which fondants can be made merely by the addition of a suitable liquid followed by mixing. A description of some of these prior attempts is contained in U.S. Patent No. 2,824,808 which issued Feb. 25, 1958 in the names of Eugene C. Gilbert and Richard N. Prince.

Both the brown sugars and the dry fondant mixes of the prior art are extremely hygroscopic and as a result tend to cake severely when stored for long periods of time. Attempts to solve this problem have been made in the dry fondant mix art by incorporating anti-caking agents such as starch, tricalcium phosphate and the like. The disadvantages of this approach are obvious.

In the brown sugar art reliance is placed on careful packaging and on the provision of large sucrose crystals to inhibit caking. As any housewife knows, the present brown sugars are less than satisfactory in this regard.

Moreover, in the instance of U.S. Patent No. 2,910,388 which issued Oct. 27, 1959 in the names of Alfred Lachmann and Freeman Bush, a dried granular brown sugar is coated with a concentrated solution of an edible non-hygroscopic sugar, such as sucrose. Apparently the sucrose coating protects the brown sugar from the effects of the atmosphere. The presence of the sucrose coating undesirably changes the flavor and texture of the product.

It is therefore the general object of this invention to provide sugar-syrup mixtures in a non-caking, free-flowing and readily dispersible form.

A further object of the invention is to provide soft sugars, particularly brown sugars and fondant mixtures, which remain non-caking, free-flowing and readily dispersible over relatively long periods of time in storage.

A yet further object of the invention is to attain the aforementioned objects without resort to additives.

In accordance with the present invention, the above objects are attained by:

(a) forming a mixture of fractured sugar crystals and syrup, the syrup coating substantially the entire surface area of the fractured sugar crystals, and the weight ratio of syrup to fractured sugar crystals being greater than the sugar crystals could accommodate prior to fracturing and yet be free-flowing, but no greater than the fractured sugar crystals can accommodate and yet be free-flowing; and (b) forming porous agglomerates from the resultant mixture by adding moisture to increase the tackiness of the surfaces of the individual coated particles and agitating the tacky particles to form agglomerates.

The term "sugar crystals" as used herein means dextrose, sucrose, and similar sugars or mixtures thereof in the crystalline form of the type resulting from conventional sugar refining processes.

The term "fractured sugar crystals" as used herein means the product resulting from comminution of sugar crystals.

The term "syrup" as used herein means aqueous solutions of sugars, at least a portion of which do not crystallize or are very difficult to crystallize. The most commercially important examples of syrups containing non-crystallizing sugars are invert sugar syrups, molasses, and glucose syrups, the latter term being used to describe corn syrup rather than aqueous solutions of pure dextrose.

The term "agglomerate" as used herein refers to a stable aggregate of a multiplicity of small individaul particles held together at points of contact between contiguous particles, and defining a multiplicity of voids and interstices which extend throughout the aggregate.

In the present invention, the presence of fractured sugar crystals and the accompanying increased surface area which is thus available to carry the relatively large amounts of syrup necessary in soft sugar products allows the use of agglomeration to modify the physical characteristics of the mixture to provide porous agglomerates having large internal surface areas. In the absence of such fractured sugar crystals, the amount of syrup present would prevent the use of agglomeration step to reassemble the coated fractured crystals into porous, free-flowing agglomerates having a large interior surface area. In addition to being free-flowing, the agglomerates are quickly dispersible in aqueous liquids and are quite surprisingly very stable and non-caking over relatively long periods of storage. Fondants can be made from the fondant mix products of the present invention merely by adding appropriate amounts of aqueous liquid and mixing by hand for only one or two minutes, in contrast to the long, complex, and tedious procedures of the prior art. Thus the invention provides a relatively simple process for overcoming the disadvantages of the prior art without resorting to the use of additives, foreign coating materials or complex boiling and mixing steps.

With respect to the relative amounts of sugar and syrup, the present invention is applicable only to those mixtures which contain sufficient syrup to interfere with the free-flowing character of the unfractured parent crystals. If less than that amount of syrup is present, the mixture remains free-flowing under normal conditions and additional surface area provided by fracturing is not needed. It is also necessary that the amount of syrup be no greater than the amount which would render the sugar crystals nonfree-flowing in their fractured state. If more than this amount is present, agglomeration cannot be used to reassemble the fractured crystals into porous, stable, free-flowing aggregates.

The relative amounts of syrup and sugar contemplated by the present invention are illustrated by brown and painted brown sugars where the molasses content ranges up to 20% (usually between 10 and 15%) and the dry fondant products where the syrup content (on a 90 weight percent solids basis) ranges up to approximately 25% (usually between 5 and 12%). It will be appreciated, however, that these syrup contents are merely illustrative of products to which the invention is applicable. Before grinding these products are not free-flowing and are moist to the touch. Immediately after grinding, however, the products are in a free-flowing condition and are apparently dry even though little or no moisture has been removed.

The mixture of fractured sugar crystals and syrup may be formed in any convenient manner. Most advantageously, the parent sugar crystals and syrup are blended to form a damp sticky mixture which is then subjected to grinding to produce the desired free-flowing mixture of fractured sugar crystals and syrup. Alternatively, the sugar crystals may be ground separately and the resulting fractured sugar crystals combined with the syrup to provide the desired mixture of fractured sugar crystals and syrup. In either event, the sugar crystals must be ground to provide sufficient surface area over which the syrup can be distributed so that an apparently dry and free-flowing product results which can be subjected to agglomeration. In the case of dry fondant mixes and painted sugars, the syrups and sugars often are derived from different sources and in such cases must be mixed. However, in the case of brown sugar resulting from a cane refining process, the molasses syrup is usually present in the product.

As exemplary of the degree to which sugar-syrup mixtures must be ground to provide the necessary surface area for agglomeration, sugars containing 10 to 15% molasses and fondants containing 5 to 12% syrup must generally be ground to the point where a major portion of the particles are less than 150 microns in size. More preferably, all the particles should be substantially below 100 microns in size. Moreover, where the characteristic smooth fondant texture is desired it is necessary that the sugar be ground to the point where substantially all particles are undetectable to the tongue, or in other words, less than 40 microns in diameter. As will be illustrated in an example set forth below, a brown sugar fondant mix can be made merely by grinding brown sugar to the orally undetectable particle size range and agglomerating the ground product.

Although the apparently dry mixture of fractured sugar crystals and syrup is free-flowing, it has a pronounced tendency to cake, which tendency is greater than that encountered in syrup-sugar mixtures where the sugar is in the form of unfractured crystals. If left unprotected in this form, the product will quickly set up into a hard cake which must be subjected to further grinding to return it to a free-flowing granular condition. In view of the fact that the tendency toward caking increases with a reduction in particle size, it is quite surprising that the agglomerated particles of the present invention display the resistance to caking that they do.

While the reason for this phenomenon is not fully understood, it is believed that the reason for the stability is that agglomeration provides large internal voids and surface areas which can accommodate changes in humidity without causing the agglomerates to lose their porosity. In other words, the structure provided by agglomeration apparently holds substantial portions of the surfaces of the individual particles apart so that upon absorption of moisture the particle surfaces do not fuse together to form a caked mass.

Another specific form of soft sugar which may be advantageously processed in accordance with the present invention is the sugar-syrup mixture resulting from concentration and solidification of whole cane juice. "Whole cane juice" as that term is used herein means the liquid resulting from the processing of sugar cane, sugar beet or sorghum before any sugar content is removed therefrom. This material may be concentrated, preferably after clarification, by boiling to about 92° to 98° Brix. Upon cooling, a mixture of sugar crystals and crude syrup results. This mixture may then be ground to produce a mixture of fractured sugar crystals having a large surface area with a crude syrup distributed substantially entirely over the surface of the fractured crystals. After agglomeration a product results which is stable and instantly soluble.

The agglomeration step of the present invention may be carried out by any process in which the individual syrup coated particles are superficially moistened to provide tacky surfaces, agitated to bring the moistened tacky particles into contact to form agglomerates containing a multiplicity of individual particles, and dried to set the agglomerates in the agglomerated form. However, it is preferred that the agglomeration process disclosed and claimed in U.S. Patent No. 2,995,773 of common assignee be used. That process is especially advantageous in that the amount of moisture added and the residence time of the particles in the agglomerating zone can be carefully controlled. Only very small amounts of moisture are necessary to accomplish agglomeration. An increase in moisture of approximately 3% is usually sufficient with the maximum limit being on the order of 6%. The aforementioned process of U.S. Patent No. 2,995,773 is especially adapted to operate in this moisture addition range.

Although the preferred agglomeration process is fully described in U.S. Patent No. 2,995,773, a brief description is included herein for convenience. Referring to FIGURE 1, which is a schematic drawing of agglomeration apparatus, a supply of ground syrup-coated particles is contained in feed hopper 10 and supplied to an elongate agglomerator 12 by screw conveyor 11. Agglomerator 12 contains a perforate screen 13 upon which the syrup-coated particles are initially deposited and across which the particles travel during the agglomeration process.

The agglomerator shown is divided into a series of adjacent operational compartments labeled AD and CS in which agglomeration, drying, cooling and sizing successively take place.

Means are also provided for vibrating the entire agglomerator to provide the generally forward motion of the bed of coated particulate material passing therethrough, which means include the supporting rocker arms 14 and the eccentric drive pitman 15. As the material travels over the perforate screen 13, it is maintained in a substantially fluidized condition by a stream of solvent vapor gas capable of forming adhesive surfaces on the coated particles such as a humid air or water vapor capable of being condensed on the coated particles. The vapor gas is constantly injected into the lower portion of the first compartment or agglomeration section A through the port 16 and passes upwardly through the screen 13 and the bed of material at a velocity sufficient to maintain the particulate bed of finely ground pulverulent material in a substantially fluidized state and the particles comprising the bed in close proximity and, after passing through the bed of material, is removed through a suitable discharge or exhaust port 17 provided on top of the agglomerator.

As the surfaces of the fine particles in compartment A become adhesive due to the condensation of the moisture thereon, the agitation and movement of the particles in the substantially fluidized bed in compartment A bring the dispersed particles into random contact with one another and cause them to stick or adhere together to progressively build up the cluster of particles comprising the agglomerates of this invention.

The agglomerated material passes from compartment A to the next stage or compartment D in which the material is dried and the moisture added in compartment A is removed by means of a current of hot air, the temperature of which depends upon the amount of water to be removed. In the apparatus shown in the accompanying drawings, the hot drying air passes constantly through the screen 13 and through the bed of agglomerates in compartment D to strengthen and rigidify the agglomerates as the added moisture is removed therefrom. The stream of hot air entering the bottom of compartment D through duct 18 exits through opening 19 in the roof.

After drying, the hot dried agglomerates pass to the next or final stage or compartment CS in which the agglomerates are optionally subjected to a stream of cooling air entering from duct 20 and exhausting through escape opening 21 in the roof to cool the agglomerates to room temperature and place them in a rigid state. In the last compartment CS the agglomerates are also classified while being cooled. The hot dried agglomerates pass from the screen 13 onto a coarser classifying screen 22, the product falling through screen 22 onto the finer collection screen 23 therebelow, the over-sized material remaining on the screen 22, the product and overs being discharged as indicated.

The agglomerates of the present invention may be broadly described as loose, lacey, porous clusters of very small individual syrup-coated fractured sugar crystals bonded together at their interfaces by substantially point contact and defining a multiplicity of voids and interstices therebetween which extend throughout the agglomerates. An aqueous liquid can rapidly penetrate the agglomerates and quickly reach each of the individual particles making up the agglomerate and thereby free the individual particles which then become dispersed and dissolved in solution. The agglomerates are characterized as being substantially free-flowing, non-caking, friable and relatively uniform in configuration. Moreover each agglomerate consists of more than 5,000 individual syrup-coated fractured sugar crystals, the agglomerates themselves falling within the size range of 4 to 100 mesh and having a bulk density less than the starting material.

The following examples are given to further illustrate the invention:

EXAMPLE I

Operational Run A (brown sugar)

In this operational run, a brown soft sugar was ground finer than 60 microns and then agglomerated in apparatus corresponding to that illustrated in the accompanying drawing. The brown sugar was fed to the agglomerator at the rate of 100 pounds per hour with the vibrating equipment having a stroke of ½ inch and a frequency of 950 cycles per minute. The agglomerating fluidizing humid air entering compartment A, which was 12 inches in length, had a wet bulb temperature of 160° F., and a dry bulb temperature of 280° F., and passed through the bed of material at a rate of about 100 c.f.m. The drying section of the agglomerator was 60 inches long and the temperature of the drying air was 300° F. The agglomerates resulting from this operational run exhibited the typical characteristics of agglomerated coated materials and soft sugars as set forth hereinbefore. The majority of the agglomerates was smaller than 6 mesh and larger than 48 mesh.

Operational Run B (raw sugar)

In this operational run raw cane sugar was ground finer than 50 microns and then agglomerated in equipment of the type shown in the accompanying drawing. The ground raw sugar was fed to the agglomerator at the rate of 300 pounds per hour and the vibrating equipment operated on a ½ inch stroke at a frequency of 850 cycles per minute. The length of the agglomeration section was 18 inches and the fluidizing and agglomerating humid air had a wet bulb temperature of 174° F., and a dry bulb temperature of 290° F., and passed through the bed of material at a rate of about 100 c.f.m. The drying section was 54 inches long and the drying air had a temperature of about 255° F. The agglomerates resulting from this operation exhibited all of the desirable agglomerated soft sugar characteristics noted hereinbefore as being characteristic of agglomerated coated material products of our invention. In addition, the agglomerated raw sugar was good tasting, in contrast to the unagglomerated raw sugar. The majority of the agglomerated raw sugar was smaller than 6 mesh and larger than 48 mesh and the agglomerated raw sugar had a bulk density of .40 gram per cc.

EXAMPLE II

Caking and flowability tests

To illustrate the free-flowing non-caking charateristics of agglomerated soft sugars as compared with unagglomerated soft sugars, the following test was run. Agglomerated brown sugar and conventional unagglomerated unground brown sugar were placed in separate open pans and each was subjected to the same high temperatures and high humidity conditions for a period of 24 hours. Each of these samples at the end of this 24-hour period was then dried in a vacuum dryer for 3 hours and then left exposed to room temperatures overnight for a period of about 12 hours. At the end of these tests, the regular unground unagglomerated brown sugar had many hard lumps which were not friable and the agglomerated brown sugar remained free-flowing with no indication of lumping of any kind.

EXAMPLE III

Prepartion of instant brown sugar fondant

For this test we selected a soft brown sugar. Special care was taken in grinding the sugar to a particle size of less than 40 microns before agglomeration. A ground product of this type is highly unstable and tends to cake immediately. Accordingly the ground product was agglomerated immediately after grinding and the agglomerated product was converted into a fondant by mixing 100 parts of the agglomerated brown sugar with 15 parts of warm water for about one minute. The resultant fondant was equal in gloss and flexibility to a boiled fondant of the identical composition of sugars. A fondant having such characteristics cannot be made in such manner from conventional soft brown sugar.

EXAMPLE IV

Rate of dissolution of agglomerated soft brown sugars in water as compared with the rate of dissolution of unagglomerated soft brown sugars In this tests, three different samples of soft sugars were placed on the surface of a column of cold water 50 inches in length. One of these samples consisted of conventional brown granulated sugar, another sample consisted of this same conventional brown granulated sugar ground to fine powdered form and the third and remaining sample consisted of this ground conventional brown sugar in agglomerated form. These samples were allowed to fall freely down the column of cold water, and the rate of dissolution was measured. The conventional granulated brown sugar was substantially completely dissolved after falling 23 inches in the tube. The ground conventional sugar lumped up and was undissolved after reaching the bottom of the tube and remained partially undissolved even after an extended period of time. The agglomerated brown sugar was completely dissolved after falling only 6½ inches. This test illustrates the difference in the rates of solubility between agglomerated brown sugars and the conventional granulated brown sugars and conventional brown sugars which have been ground to fine powdery form, with the agglomerated brown sugar dissolving faster than the granulated and the powdered.

EXAMPLE V

Instant agglomerated fondant mix (sucrose and corn syrup)

The following is a typical example of the preparation of a stable dry free-flowing agglomerated fondant mix made according to this invention. A mixture consisting of 85% sucrose and 15% liquid corn syrup (43° Baume) was prepared and subjected to a fine grinding operation reducing the sucrose to a size of less than 40 microns. The fine pulverulent sucrose particles coated with a thin film of the corn syrup were then agglomerated according to the method of this invention in apparatus similar to that illustrated in the accompanying drawing and hereinbefore described. The agglomerating section was 18 inches long and the agglomerator was vibrated with a ½ inch stroke at a frequency of 750 cycles per minute. The pulverulent coated particles were fed to the agglomerating section at a rate of 500 pounds per hour. The fluidizing and moisturizing humid air was passed upwardly through the bed of pulverulent material in the agglomeration section at a rate of 98 c.f.m., the incoming humid air having a wet bulb temperature of 160° F., and a dry bulb temperature of 300° F. The drying section was 81 inches long, and drying air at 270° F. was fed through the agglomerates in the drying section at a rate of 196 c.f.m. The major portion of the agglomerates was smaller than 10 mesh and larger than 40 mesh in size. The agglomerates were of good quality and were free-flowing, non-caking and readily dispersible and soluble in water, and they exhibited the typical characteristics of agglomerated products of this invention. The agglomerates also formed a fondant comparable in quality to a boiled fondant when reconstituted with the requissite amount of water.

EXAMPLE VI

Instant agglomerated fondant mix (sucrose and invert)

A mixture consisting of 85% sucrose and 15% invert sugar syrup was prepared and ground to an orally undetectable size of less than 35 microns. The grinding was accomplished while passing air having a temperature of 220° F. through the grinder to dry the mix.

The finely ground mixture which is unstable, not free-flowing, and subject to immediate caking was then fed into an agglomerator similar to that illustrated at a rate of 400 pounds per hour and a temperature of 130° F. The agglomerating section was 18 inches long and 6 inches wide. The agglomerating humid air was passed upwardly through the agglomerating section at a rate of 100 feet per minute, said air having a wet bulb temperature of 155° F. and a dry bulb temperature of 280° F. The agglomerator was vibrated at 800 c.p.m., with an amplitude or stroke of ⅝ inch. Drying air at 265° F. was passed through the drying section (which was 81 inches long) at a rate of 200 c.f.m. A good agglomerated product typical of this invention was formed, which was converted into a perfect fondant, without any cooking operation, by mixing 100 parts of agglomerated product with 15 parts of warm water for thirty seconds, the mixing operation being carried out on a water bath of 60° C. The resulting fondant was equal in gloss and texture to a conventional cooked fondant of identical composition.

EXAMPLE VII

Dry instant soft drink base

A dry instant agglomerated soft drink base was prepared from one quart of liquid root beer flavored syrup base and 78 pounds of sucrose. Twenty pounds of powdered sugar was blended with a quart of root beer syrup and then mixed with 58 pounds of granular sugar. The total mixture was finely ground and then agglomerated with apparatus similar to that shown and described at the rate of 5 pounds per minute using a ½ inch stroke at 800 cycles per minute frequency. The agglomerating section was 18 inches long and 6 inches wide. The agglomerating humid air had a wet bulb temperature of 185° F., and a dry bulb temperature of 300° F., and was passed through the bed of material in the agglomeration section at a rate of about 100 c.f.m. The drying section was supplied with air at 275° F. A very good agglomerated product resulted which quickly reconstituted with water into a root beer drink. Similar drink mixes may be made using syrups derived by concentrating natural fruit juices.

The examples given above are merely illustrative and should not be interpreted in a limited sense. Rather the invention should be limited only by the following claims.

What is claimed is:

1. A method of producing free-flowing, non-caking particles consisting essentially of sugar and syrup, which comprises:
   (a) forming a mixture of fractured sugar crystals having an average diameter of less than 150 microns and syrup, the syrup coating substantially the entire surface area of the fractured sugar crystals and the weight ratio of syrup to fractured sugar crystals being greater than the sugar crystals could accommodate prior to fracturing and yet be free-flowing, but no greater than the fractured sugar crystals can accommodate and yet be free-flowing; and
   (b) forming porous agglomerates from the resultant mixture by dispersing the syrup-coated, fractured sugar crystals in a water vapor-containing, fluidizing gas having an elevated temperature substantially higher than that of the syrup-coated, fractured sugar crystals and adding less than 6% moisture by weight to said syrup-coated, fractured sugar crystals, by condensation of moisture from said water vapor-containing fluidized gas to increase the tackiness of the surfaces of the individual coated particles; agitating the tacky particles to form agglomerates; and drying the resulting agglomerates.

2. The method of producing free-flowing, non-caking particles from soft sugar which comprises:
   (a) providing a soft sugar consisting essentially of sugar crystals having an average diameter of less than 150 microns and syrup, the amount of syrup being sufficient to render the soft sugar nonfree-flowing.
   (b) fracturing the sugar crystals to the point where the soft sugar is free-flowing and apparently dry to the touch; and
   (c) forming porous agglomerates from the resultant mixture by dispersing the syrup-coated, fractured sugar crystals in a water vapor-containing fluidizing gas having an elevated temperature substantially higher than that of the syrup-coated, fractured sugar crystals and adding less than 6% moisture by weight to said syrup-coated, fractured sugar crystals, by condensation of moisture from said water vapor-containing fluidizing gas to increase the tackiness of the surfaces of the individual coated particles; agitating the tacky particles to form agglomerates; and drying the resulting agglomerates.

3. The method of producing a free-flowing, non-caking brown sugar which comprises:
   (a) forming a free-flowing, apparently dry mixture of fractured sucrose crystals having an average diameter of less than 150 microns and molasses, the molasses being present at a concentration within the range of 10% to 15% by weight and coating substantially the entire surface area of said fractured sucrose crystals; and
   (b) forming porous agglomerates from the resultant mixture by dispersing the syrup-coated, fractured sugar crystals in a water vapor-containing fluidizing gas having an elevated temperature substantially higher than that of the syrup-coated, fractured sugar crystals and adding less than 6% moisture by weight to said syrup-coated, fractured sugar crystals, by condensation of moisture from said water vapor-containing fluidizing gas to increase the tackiness of the surfaces of the individual coated particles; agitating the tacky particles to form agglomerates; and drying the resulting agglomerates.

4. The method of claim 3 wherein the mixture of fractured sucrose crystals and molasses is formed by grinding brown sugar to the point where a major portion of the sucrose particles are less than 150 microns.

5. The method of claim 3 wherein substantially all of the sucrose particles are smaller than 40 microns.

6. The method of preparing a dry fondant mix comprising:
   (a) forming a free-flowing mixture of fractured sugar crystals having an average diameter of less than 150 microns and a syrup selected from the group consisting of invert syrup, glucose syrup and mixtures thereof, the syrup coating substantially the entire surface area of said fractured sugar crystals and being present at a concentration of from about 5% to 12% by weight; and
   (b) forming porous agglomerates from the resultant mixture by dispersing the syrup-coated, fractured sugar crystals in a water vapor-containing fluidizing gas having an elevated temperature substantially higher than that of the syrup-coated, fractured sugar crystals and adding less than 6% moisture by weight to said syrup-coated, fractured sugar crystals, by condensation of moisture from said water vapor-containing fluidizing gas to increase the tackiness of the surfaces of the individual coated particles; agitating the tacky particles to form agglomerates; and drying the resulting agglomerates.

7. The method of claim 6 wherein said mixture of fractured sugar crystals and syrup is formed by grinding a mixture of sugar crystals and syrup to the point where substantially all of said sugar crystals are less than 40 microns in size.

8. The method of producing agglomerates from a brown sugar, wherein said brown sugar consists essentially of sucrose crystals coated with molasses comprising the steps of pulverizing the brown sugar to form a free-flowing apparently dry mixture of fractured sucrose crystals having an average diameter of less than 150 microns and molasses, exposing said pulverized material to a humid atmosphere having an elevated temperature substantially higher than that of the molasses coated sucrose crystals without direct liquid addition to said material to bring the moisture content of the material up to a predetermined value of less than 6% by condensation of moisture from said humid atmosphere, and during all said exposure, agitating said material so as to retain it in a free-flowing condition, and thereby forming it into agglomerates, and thereafter drying said agglomerates with some agitation throughout the drying step.

9. The product produced by the method of claim 1.

References Cited

UNITED STATES PATENTS

| | | | |
|---|---|---|---|
| 2,824,808 | 2/1958 | Gillett et al. | 99—134 |
| 2,893,871 | 7/1959 | Griffin | 99—56 |
| 2,995,773 | 8/1961 | Gidlow et al. | 18—1 |
| 3,042,526 | 7/1962 | Spiess et al. | 99—56 |
| 3,098,767 | 7/1963 | Bush | 127—63 |

FOREIGN PATENTS 909,082  10/1962  Great Britain.

MAURICE W. GREENSTEIN, Primary Examiner

U.S. Cl. X.R.

99—134; 127—30, 63